United States Patent [19]
Ikegami et al.

[11] Patent Number: 5,892,544
[45] Date of Patent: Apr. 6, 1999

[54] BEAM CURRENT DETECTION AND CONTROL SYSTEM FOR A CATHODE RAY TUBE

[75] Inventors: Hiroyuki Ikegami; Taro Tadano, both of San Diego, Calif.

[73] Assignees: Sony Electronics, Inc., Park Ridge, N.J.; Sony Corporation, Tokyo, Japan

[21] Appl. No.: 929,991

[22] Filed: Sep. 15, 1997

[51] Int. Cl.$^6$ .................................................. H04N 5/68
[52] U.S. Cl. ........................................ 348/380; 348/327
[58] Field of Search ...................... 348/379, 380, 348/381, 382, 500, 326, 327, 805, 809, 810, 811; 315/379, 364

[56] References Cited

U.S. PATENT DOCUMENTS

| | | | |
|---|---|---|---|
| 4,149,110 | 4/1979 | Dallos | 315/107 |
| 4,224,640 | 9/1980 | Hovens et al. | 358/242 |
| 4,318,034 | 3/1982 | Nakamura | 315/383 |
| 4,387,390 | 6/1983 | Reneau et al. | 358/74 |
| 4,442,458 | 4/1984 | Barter | 358/243 |
| 5,589,883 | 12/1996 | Ogino et al. | 348/379 |

*Primary Examiner*—Andrew I. Faile
*Assistant Examiner*—Habte Bahgi
*Attorney, Agent, or Firm*—Blakely, Sokoloff, Taylor & Zafman LLP

[57] ABSTRACT

The present invention relates to a beam current control system for detecting and controlling a beam current generated by a cathode ray tube. The system comprises a video processing circuit that receives a first signal, and which generates a second signal that includes a video signal and a synchronization signal, which is provided to the cathode ray tube. The cathode ray tube generates a beam current corresponding to the second signal, where the beam current has a video signal portion and a synchronization signal portion. A storage element coupled between the video processing circuit and the cathode ray tube clamps the second signal at a first predetermined level, and stores an electrical charge corresponding to the video signal portion of the beam current during a first time interval. A first circuit coupled at one end to the storage element, and at the other end, to the video processing circuit, is operable upon receipt of a control signal from the video processing circuit, corresponding to the synchronization signal during the first time interval, to facilitate discharge of the electrical charge into the first circuit. The first circuit generates a third signal representative of a magnitude of the electrical charge. A second circuit coupled to the first circuit is configured to provide an output signal to the video processing circuit, the output signal corresponding to a difference between the third signal and a second predetermined level, for adjusting the beam current during a following time interval.

20 Claims, 4 Drawing Sheets

BEAM CURRENT DETECTION AND CONTROL SYSTEM FOR A CATHODE RAY TUBE

BACKGROUND OF THE INVENTION

1. Field of the Invention

The present invention relates to a method and apparatus for detecting and controlling a beam current of a cathode ray tube, through detection and control of a clamp current of the cathode ray tube, which is representative of the beam current.

2. Description of the Related Art

Cathode ray tubes ("CRT") are typically employed in electronic display systems, such as a television receiver or a display apparatus including a CRT numerical display. In such electronic display systems, luminance or brightness control is typically desired. Luminance indicates the amount of light intensity which is perceived by the eye as brightness. Such luminance control is also termed "white balance" since white light may be considered and provided as a mixture of the red, green and blue primary colors in the proper proportions.

In CRTs, drift characteristics due to aging result in image luminance distortion or the alteration of the white balance. One attempted approach to solving this problem includes the detection and use of the beam current from the CRT driver circuit to control the luminance of the display system. However, since the signal level of the beam current is very small (typically in the order of 10–20 $\mu A$), it is difficult to detect. As a result, use of the beam current in controlling luminance is unreliable. In the same manner, use of the beam current in controlling any video signal parameter, is unreliable.

Accordingly, there is a need in the technology for a method and apparatus for a reliable control system for detecting and controlling a beam current of a cathode ray tube in a display system, so as to accurately control a video signal parameter.

BRIEF SUMMARY OF THE INVENTION

The present invention relates to a beam current control system for detecting and controlling a beam current generated by a cathode ray tube. The system comprises a video processing circuit that receives a first signal, and which generates a second signal that includes a video signal and a synchronization signal, which is provided to the cathode ray tube. The cathode ray tube generates a beam current corresponding to the second signal, where the beam current has a video signal portion and a synchronization signal portion. A storage element coupled between the video processing circuit and the cathode ray tube clamps the second signal at a first predetermined level, and stores an electrical charge corresponding to the video signal portion of the beam current during a first time interval. A first circuit coupled at one end to the storage element, and at the other end, to the video processing circuit, is operable upon receipt of a control signal from the video processing circuit, corresponding to the synchronization signal during the first time interval, to facilitate discharge of the electrical charge into the first circuit. The first circuit generates a third signal representative of a magnitude of the electrical charge. A second circuit coupled to the first circuit is configured to provide an output signal to the video processing circuit, the output signal corresponding to a difference between the third signal and a second predetermined level, for adjusting the beam current during a following time interval.

DETAILED DESCRIPTION OF THE INVENTION

The present invention is an apparatus and method of detecting and controlling a beam current of a cathode ray tube ("CRT"), through detection and control of a clamp current which is representative of the beam current. The controlled beam current may be used to adjust a video signal parameter, such as brightness. The present invention may be used to detect and control the beam current of each cathode of the CRT.

Figure 1:
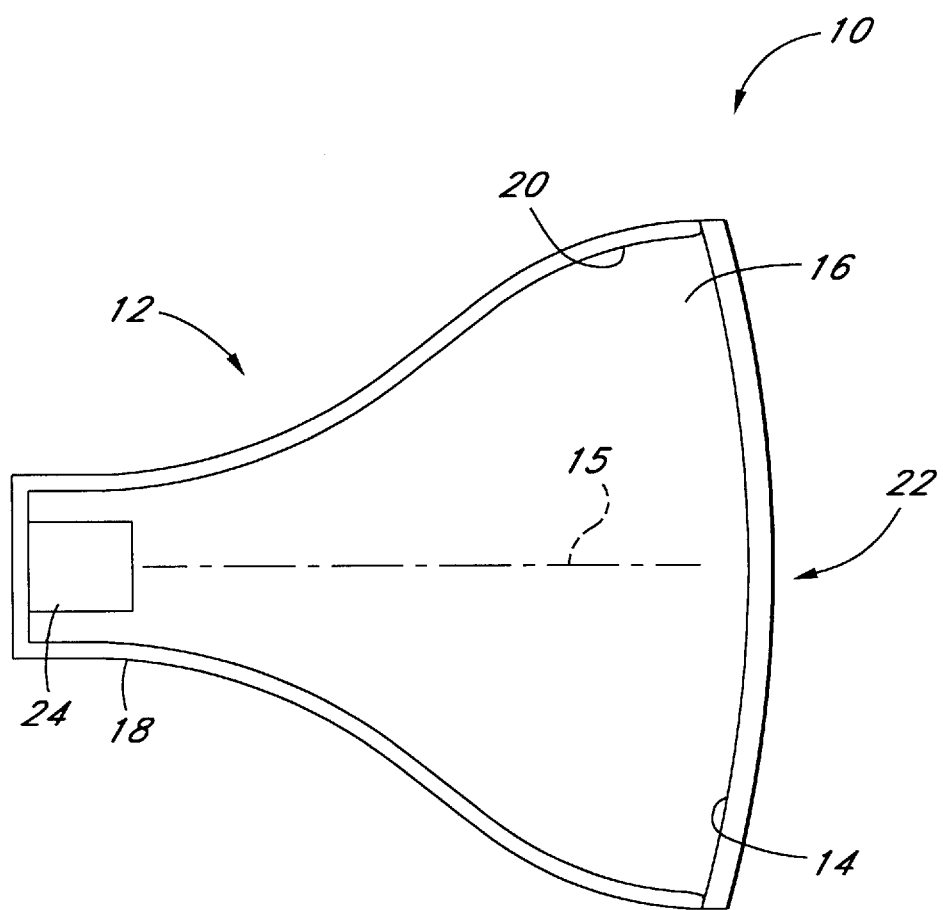
FIG. 1 is a cross sectional view of a conventional cathode ray tube.

As shown in FIG. 1, the CRT 10 consists of an electron gun 12 and a phosphor screen 14 that is located inside an evacuated glass envelope 16. The narrow neck 18 of the CRT 10 contains the electron gun 12, which generates a beam of electrons 15. The beam is accelerated towards the screen 14 by a positive anode voltage. The anode 20 is a conductive coating on the inside surface of the wide glass bell portion of the CRT 10. To form the screen, the inside of the faceplate 22 is coated with a luminescent material that produces light when excited by electrons in the beam 14. A monochrome picture tube has one electron gun and a continuous phosphor coating that produces a picture in black and white. For color picture tubes, the screen 15 is formed with dot trios or vertical lines of red, green and blue phosphors. In such color picture tubes, there are three electron beams, one for each color phosphor. Each of the three electron beams is emitted by a separate cathode.

Figure 2:
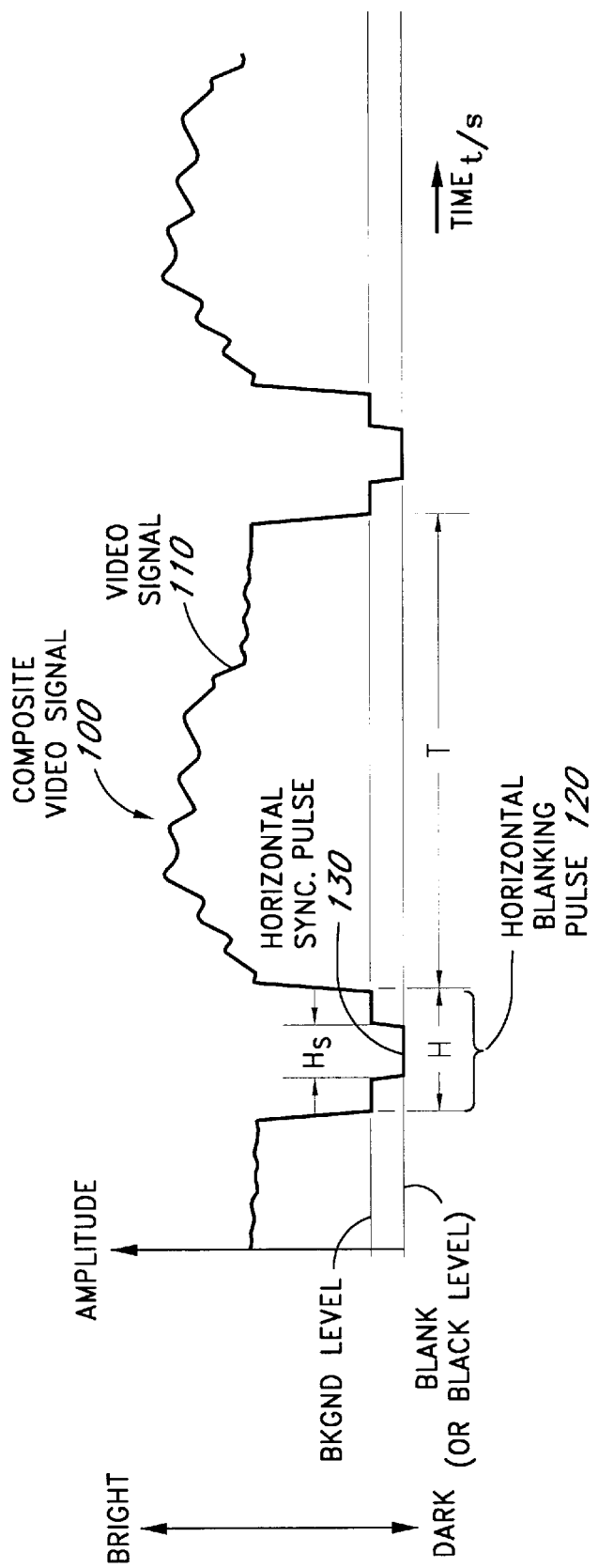
FIG. 2 is a graph of a composite video signal with respect to time.

FIG. 2 is a graph of a composite video signal with respect to time. The composite video signal 100 comprises a video signal 110 having an interval of "T", and a horizontal blanking pulse 120 having an interval of "H". The T interval corresponds to the active video period when the electron beam 15 (see FIG. 1) is sweeping and the video signal is being displayed on the screen 14. With reference to the extreme left portion of FIG. 2, which corresponds to time t=0 s, the video signal 110 is at a white or bright level. At this time, the scanning beam 15 proceeds with scanning at the left side of an image to be displayed. As the first line is scanned from left to right, signal variations are obtained with various amplitudes that correspond to the required picture information. After the horizontal trace produces the desired camera signal for one line, the scanning beam 15 will be positioned at the right side of the image. The blanking pulse 120 is then inserted to bring the video signal amplitude up to the black level so that retrace can be blanked out. The horizontal blanking pulse 120 has two voltage levels: the background (BKGND) level and the black or blank (BLANK) level. The black level corresponds to the level of a horizontal synchronization pulse 130 having an interval $H_s$, which is used to synchronize the transmitter and receiver scanning in the CRT 10.

The present invention monitors the beam current 15 indirectly by measuring a clamp current Ic (which is representative of the beam current 15) during the horizontal synchronization pulse 130 (the Hs interval in FIG. 2). In one embodiment, the clamp current Ic has an approximately linear relationship with the beam current 15 within the operational range of the beam current 15. During the horizontal synchronization pulse 130, the amount of the clamp current Ic reflects the amount of the beam current 15 generated over the previous video signal 110 pulse (during the T interval). By measuring the clamp current Ic during the Hs interval, the amount of the beam current 15 can be adjusted accordingly during the next video signal 110 pulse (i.e., during the next T interval). This is accomplished through the use of a beam current control circuit, as discussed in detail in the following sections.

Figure 3:
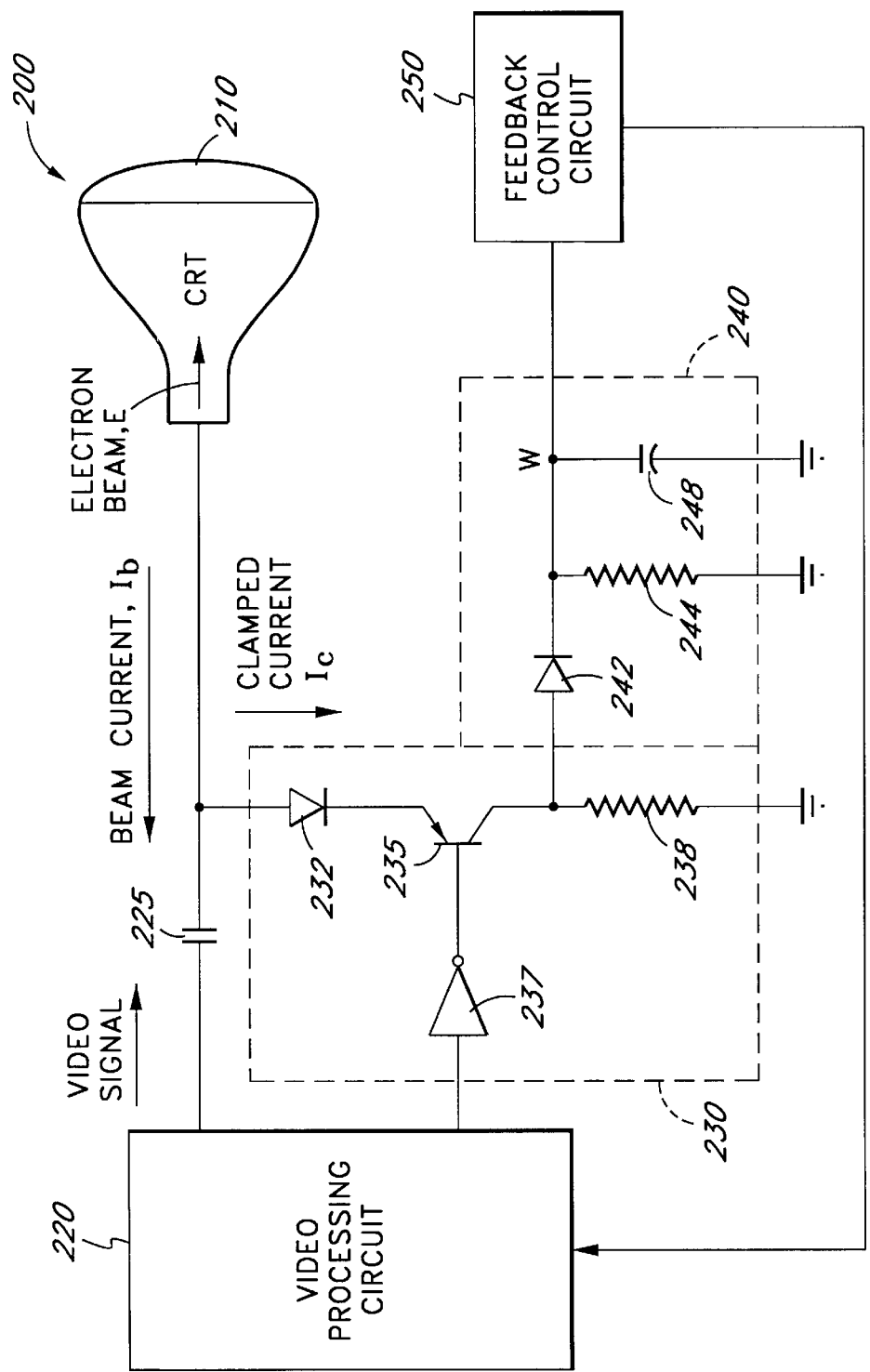
FIG. 3 is a diagram illustrating an electronic display system 200 which implements one embodiment of the beam current control circuit 202 of the present invention.

Referring to FIG. 3, a diagram illustrating an electronic display system 200 which implements one embodiment of the beam current control circuit 202 of the present invention. The electronic display system 200 includes the beam current control circuit 202 and a cathode ray tube (CRT) 210. The beam current control circuit 202 includes a video processing circuit 220, a capacitor 225, a clamping circuit 230, a clamp current detector 240, and a feedback control circuit 250. The CRT 210 may be any conventional CRT that includes an electron gun which generates an electron beam. In one embodiment, the CRT 210 may be implemented within a television system. In an alternate embodiment, the CRT 210 may be implemented within a computer monitor. The magnitude of the beam current $I_b$ is proportional to the number of electrons (i.e., the magnitude of the electron beam E) that are emitted by the cathode 24 (see FIG. 1) in the electron gun 12 and which are accelerated towards the screen 15. As provided by convention, the direction of flow of the beam current $I_b$ is opposite to the direction of flow of the electron beam E.

With reference to FIGS. 2 and 3, to ensure that black level (or the luminance) of the displayed image on the CRT 10 is consistent, the blanking level of the composite video signal 100 has to be stabilized. However, the magnitude of the electron beam E (and thus the magnitude of the beam current $I_b$) fluctuates due to inherent drift characteristics of the CRT 10. To properly correct, and thus stabilize the magnitude of the beam current $I_b$ (which subsequently stabilizes the blanking level of the composite video signal 100), a feedback system is provided. However, it has been observed that direct use of the beam current $I_b$ in controlling luminance is unreliable, since the beam current $I_b$ is very small, in the order of microamps. The present invention thus utilizes the clamped current $I_c$, which is approximately linearly proportional to, but larger and more stable than, the beam current $I_b$, to provide correction and/or stabilization of a parameter of the displayed image, such as luminance.

The video processing circuit 220 includes circuitry to generate an electron beam corresponding to one of the three components Red-Yellow (R-Y), Green-Yellow (G-Y), and Blue-Yellow (B-Y), in the CRT 210. For present discussion purposes, only one electron beam as generated by one cathode in the CRT 210 will be referred to. It is understood by one of ordinary skill in the art that the present invention may be implemented for each cathode of the CRT 210. The video processing circuit 220 also generates a control signal to the clamping circuit 230 for synchronizing the monitoring of the clamped current $I_c$, as discussed in detail in the following sections. The feedback control circuit 250 monitors the clamped current Ic, and if the clamped current Ic is above a predetermined amount, the feedback control circuit 250 issues a signal to the video processing circuit 220, which adjusts the magnitude of the electron beam E, and thus the magnitude of the beam current $I_b$, accordingly. This adjustment may be performed by an programmable gain current amplifier or a current digital-to-analog converter.

Figure 4:
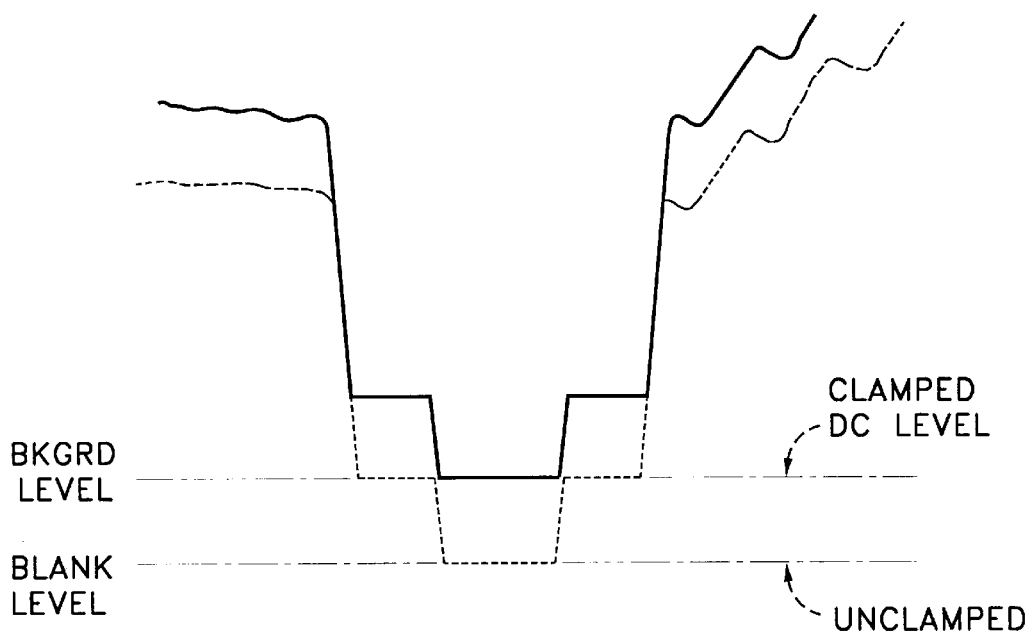
FIG. 4 illustrates the clamping of the composite video signal of FIG. 2.

To accomplish this, a clamping circuit 230 is used to clamp the level of the composite video signal 100 to the DC level of the composite video signal 100 generated by the video processing circuit, as shown in FIG. 4. Such a clamping process will only occur during the horizontal sync period Hs (see FIG. 2). This is because the beam current $I_b$ charges the capacitor during the interval T (i.e., the portion of the beam current $I_b$ corresponding to the video signal 110 portion of the composite video signal 110 charges the capacitor 225), but during the Hs interval, the capacitor 225 discharges the stored charge through the clamping circuit 230. In particular, the clamping circuit 230 provides a signal path for diverging some amount of the beam current $I_b$ for detection. During the horizontal sync period Hs, the amount of clamp current $I_c$ is proportional to the portion of the beam current in the previous active video interval (T interval in FIG. 1).

The clamping circuit 230 includes a diode 232, a transistor 235, a base current control circuit 237, and a resistor 238. Diode 232 provides the clamping effect when the transistor 235 conducts. The transistor 235 acts like a current switch to allow the current to flow through. The base current control circuit 237 is used to control the turning on or turning off of the transistor 235. In its simplest form, the base current control circuit 237 is a buffer driver which receives a control signal from the feedback control circuit 250. The control signal is only issued during the Hs interval. The resistor 238 is used to provide the load for the clamp current detector 240.

The clamp current detector 240 detects the amount of the clamp current throughout the active video T interval as shown in FIG. 1. The clamp current detector 240 includes diode 242, resistor 244, and capacitor 248. Diode 242 provides a voltage drop. Resistor 244 and capacitor 248 provide filtering effect for smoothing the resulting voltage. The voltage at the terminal W is fed to the feedback control circuit 250.

The feedback control circuit 250 receives the voltage representing the clamp current and converts this voltage into an appropriate amount for the video processing circuit 220. The feedback control circuit 250 may be implemented in a number of ways, as is known in the technology.

Figure 5:
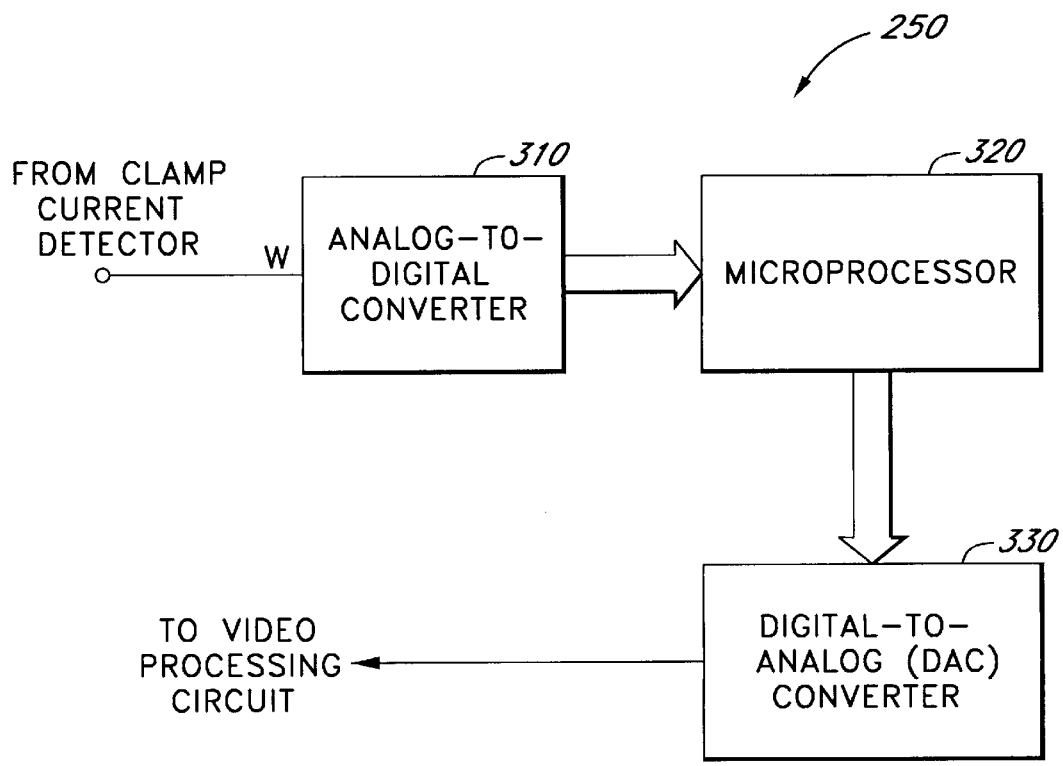
FIG. 5 illustrates one embodiment of the feedback control circuit of FIG. 4.

Referring to FIG. 5, a diagram illustrating one embodiment of the feedback control circuit 250 is shown. The feedback control circuit 250 includes an analog-to-digital converter (ADC) 310, a microprocessor 320, and a digital-to-analog converter (DAC) 330. The ADC 310 converts the voltage at the terminal W representing the clamp current into a digital value. The microprocessor 320 reads the digital value and performs some operations such as comparison, table look-up, or scaling, to produce a value representing the amount to be adjusted at the beam current. The microprocessor 320 then outputs this amount to the DAC 330 which converts that value into a corresponding analog quantity, either current or voltage. This analog quantity is used by the video processing circuit 220. Other embodiments of the feedback control circuit include an analog comparator and a programmable gain amplifier.

The present invention thus provides a method and apparatus for a reliable control system for detecting and controlling a beam current of a cathode ray tube in a display system, by detecting and controlling a clamp current of the cathode ray tube which is proportional to the beam current, so as to accurately control a video signal parameter.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A beam current control system for a cathode ray tube that generates a beam current, comprising:
   a video processing circuit that is configured to receive a first signal, said video processing circuit generating a second signal that includes a video signal and a synchronization signal, said video processing circuit providing said second signal to said cathode ray tube which generates a beam current corresponding to said second signal, said beam current having a video signal portion and a synchronization signal portion;
   a storage element coupled between said video processing circuit and said cathode ray tube, said storage element being configured to clamp said second signal at a first predetermined level, said storage element storing an electrical charge corresponding to said video signal portion of said beam current during a first time interval;
   a first circuit having a first input terminal that is coupled to said storage element, said first circuit having a second input terminal that is coupled to said video processing circuit, said first circuit being operable upon receipt of a control signal from said video processing circuit corresponding to said synchronization signal during the first time interval, to facilitate discharge of said electrical charge into said first circuit, said first circuit generating a third signal representative of a magnitude of said electrical charge;
   a second circuit coupled to said first circuit, said second circuit being configured to provide an output signal to said video processing circuit, said output signal corresponding to a difference between said third signal and a second predetermined level, for adjusting said beam current during a following time interval.

2. The system of claim 1, wherein said first circuit comprises a resistor and a switching element, said switching element having a first terminal and a second terminal that is coupled to the first input terminal and said second input terminal of said first circuit respectively, said switching element having an output terminal that is coupled to one end of said resistor, said resistor having a second end that is coupled to ground.

3. The system of claim 2, wherein said first circuit further comprises a diode coupled between the first input terminal of said first circuit and the first terminal of said switching element.

4. The system of claim 2, wherein said switching element is a transistor having a base, a collector and an emitter.

5. The system of claim 1, further comprising a third circuit coupled between said first circuit and said second circuit, said third circuit comprising a filter for filtering said third signal.

6. The system of claim 5, wherein said filter comprises a resistor coupled in parallel with a capacitor.

7. The system of claim 5, wherein said third circuit further comprises a diode coupled between said first circuit and said filter.

8. The system of claim 1, wherein said second circuit comprises an analog-to-digital converter, a processor coupled to said analog-to-digital converter and a digital-to-analog converter coupled to said processor, said processor being configured to determine the difference between said third signal and said second predetermined level.

9. The system of claim 1, wherein said second circuit comprises a comparator.

10. A beam current control system for a picture tube, comprising:
    a cathode ray tube;
    a video processing circuit that is configured to receive a first signal, said video processing circuit generating a second signal that includes a video signal and a synchronization signal, said video processing circuit providing said second signal to said cathode ray tube which generates a beam current corresponding to said second signal, said beam current having a video signal portion and a synchronization signal portion;
    a storage element coupled between said video processing circuit and said cathode ray tube, said storage element being configured to clamp said second signal at a first predetermined level, said storage element storing an electrical charge corresponding to said video signal portion of said beam current during a first time interval;
    a first circuit having a first input terminal that is coupled to said storage element, said first circuit having a second input terminal that is coupled to said video processing circuit, said first circuit being operable upon receipt of a control signal from said video processing circuit corresponding to said synchronization signal during the first time interval, to facilitate discharge of said electrical charge into said first circuit, said first circuit generating a third signal representative of a magnitude of said electrical charge;
    a second circuit coupled to said first circuit, said second circuit being configured to provide an output signal to said video processing circuit, said output signal corresponding to a difference between said third signal and a second predetermined level, for adjusting said beam current during a following time interval.

11. The system of claim 10, wherein said first circuit comprises a resistor and a switching element, said switching element having a first terminal and a second terminal that is coupled to the first input terminal and said second input terminal of said first circuit respectively, said switching element having an output terminal that is coupled to one end of said resistor, said resistor having a second end that is coupled to ground.

12. The system of claim 11, wherein said first circuit further comprises a diode coupled between the first input terminal of said first circuit and the first terminal of said switching element.

13. The system of claim 12, wherein said switching element is a transistor having a base, a collector and an emitter.

14. The system of claim 10, further comprising a third circuit coupled between said first circuit and said second circuit, said third circuit comprising a filter for filtering said third signal.

15. The system of claim 14, wherein said filter comprises a resistor coupled in parallel with a capacitor.

16. The system of claim 14, wherein said third circuit further comprises a diode coupled between said first circuit and said filter.

17. The system of claim 10, wherein said second circuit comprises an analog-to-digital converter, a processor coupled to said analog-to-digital converter and a digital-to-analog converter coupled to said processor, said processor being configured to determine the difference between said third signal and said second predetermined level.

18. The system of claim 10, wherein said second circuit comprises a comparator.

19. A method for detecting and controlling a beam current generated by a cathode ray tube, comprising the steps of:

generating a first signal that includes a video signal and a synchronization signal, providing said first signal to said cathode ray tube which generates a beam current corresponding to said signal, said beam current having a video signal portion and a synchronization signal portion;

clamping said first signal at a first predetermined level;

storing an electrical charge corresponding to said video signal portion of said beam current during a first time interval;

receiving a control signal corresponding to said synchronization signal during the first time interval, to facilitate detection of a magnitude of said electrical charge;

generating a second signal representative of the magnitude of said electrical charge;

providing an output signal for adjusting said beam current during a second time interval, said output signal corresponding to a difference between said second signal and a second predetermined level.

20. The method of claim 19, further comprising the step of filtering said second signal prior to said step of providing an output signal.

* * * * *